(12) United States Patent
Dowding et al.

(10) Patent No.: US 6,248,677 B1
(45) Date of Patent: Jun. 19, 2001

(54) CERAMIC FIBER COMPOSITE MATERIAL AND PROCESS FOR MAKING THE COMPOSITE MATERIAL

(75) Inventors: Leroy D. Dowding, Charlotte; Steven R. Schenck, Brighton; John D. Vandermark, Ann Arbor; Robert W. Price, Pinckney, all of MI (US)

(73) Assignee: Rex Roto Technologies, Inc., Fowlerville, MI (US)

( * ) Notice: Subject to any disclaimer, the term of this patent is extended or adjusted under 35 U.S.C. 154(b) by 0 days.

(21) Appl. No.: 09/174,743

(22) Filed: Oct. 19, 1998

(51) Int. Cl.[7] ........................................ B32B 7/02
(52) U.S. Cl. .................. 442/381; 442/384; 442/391; 442/408; 442/409; 428/212; 428/340; 428/921; 156/296; 156/297; 156/298; 156/303.1
(58) Field of Search ..................... 428/921, 212, 428/340; 442/381, 384, 391, 408, 409, 410; 156/296, 297, 298, 303.1

(56) References Cited

U.S. PATENT DOCUMENTS 4,619,553 * 10/1986 Fischer .

\* cited by examiner

*Primary Examiner*—Richard Weisberger
(74) *Attorney, Agent, or Firm*—Harness, Dickey & Pierce, P.L.C.

(57) ABSTRACT

A ceramic fiber blanket is inserted into a mold, and ceramic fiber slurry, preferably made with refractory ceramic fibers, binders, and water, is deposited on the blanket. Vacuum pressure is created under the blanket to pull the fibers of the slurry toward the fibers of the blanket to entangle them together. The slurry and blanket is then dried to form a rigid yet surface compliant ceramic fiber composite product with superior thermal insulating and acoustic dampening properties.

8 Claims, 3 Drawing Sheets

CERAMIC FIBER COMPOSITE MATERIAL AND PROCESS FOR MAKING THE COMPOSITE MATERIAL

TECHNICAL FIELD OF THE INVENTION

This invention generally relates to ceramic fiber materials. More specifically, this invention relates to composite materials that are made from ceramic fiber slurries and ceramic fiber blankets.

BACKGROUND

Firebricks have been used to line furnaces and kilns for many years. These bricks are durable but usually have poor thermal insulating properties. Firebricks are also very dense. As a result, the weight of firebricks produces extra costs and complications during distribution and inconvenient limitations and burdens during installation. Also, since the thermal insulating properties of firebrick are poor, lining thicknesses must often be extensive.

More recently, blankets made from ceramic fibers have been substituted for firebricks. These blankets are light weight, possess strong thermal insulating and acoustic dampening properties, and have been a successful substitution in many applications. Ceramic fiber blankets, however, are not durable or rigid. Rather, the blankets have a felt or wool-like texture and flexibility. It is this flexibility that gives blankets good resistance to thermal and bending stresses that occur in many high temperature applications.

In some instances, the flexibility of these ceramic fiber blankets may not be desired. For example, blankets can be cumbersome and difficult to hang in the interior of a furnace shell, a typical application of thermal insulation. In other instances, blankets are prone to sagging or tearing and a gradual breakdown of the thermal insulation. As combustion liners for boilers and heaters, blankets must be held in place with special fixtures or attachment systems.

Ceramic fiber boards and other shapes have been developed to provide rigid, yet highly thermal insulating products. Numerous formulations are commercially available, creating products for a wide range of temperatures and uses. These products have a uniform composition throughout the thickness. For high temperature applications, a suitable high temperature ceramic fiber formulation would be selected. As temperatures drop through the thickness of the insulation, however, lower temperature/lower cost materials could be used. This can be accomplished by using multiple materials, but complexity and construction costs may increase. Being more rigid than blanket reduces the noise suppression characteristics of these board products as well and makes it more difficult to eliminate gaps and joints in a typical construction. Also, while ceramic fiber boards have excellent thermal shock resistance, ceramic fiber blankets have even better resistance to thermal shock.

Ceramic fiber blankets can be glued to ceramic fiber board to obtain the advantages of both product forms. However, high temperature glues or cements must be used to withstand the temperatures. Additional labor and material costs are necessary. Surface preparation is critical in permanently attaching the blanket. Catastrophic failure can result from debonding or peeling of the blanket.

Therefore, there exists a need in the thermal insulating art for rigid, light weight, self-supporting materials with flexible, heat resistant, and noise reduction characteristics. Further, there remains a need to optimize such materials by minimizing the amount of high temperature/high cost materials which end up being used at temperatures far below their capability, decreasing installed cost and maximizing thermal performance. There is lastly a need for a commercially feasible system of fabricating such materials without secondary steps of gluing or anchoring boards and blankets together.

SUMMARY OF THE INVENTION

Accordingly, this invention provides for a ceramic fiber composite material that overcomes the problems and disadvantages of the conventional techniques in the art. Specifically, the present invention provides for a ceramic fiber composite material that is self-supporting yet displays a flexible, thermal shock resistant surface with acoustic dampening characteristics which can be optimized for thermal insulation value.

One aspect of the invention includes a process with three main steps. First, a ceramic fiber blanket is inserted into a mold and ceramic fiber slurry, made from ceramic fibers, binders and water, is poured over the blanket. Then, a vacuum pressure is created under the blanket to urge the fibers of the slurry toward the fibers of the blanket and entangle the fibers together. Finally, the slurry and blanket are dried to form a rigid ceramic fiber composite material. Another aspect of the invention includes the rigid yet surface compliant composite material made specifically by this process.

The final aspect of the invention includes the product itself. The product is a ceramic fiber composite material with a blanket layer and a hardened slurry layer. Each layer has ceramic fibers that are entangled together and some extending across the layers to insure that the layers are united. This entanglement of fibers provides the bond between the layers to form the rigid, yet surface compliant composite material.

Further features and advantages of the invention will become apparent from the following discussion and accompanying drawings.

DETAILED DESCRIPTION OF THE PREFERRED EMBODIMENT

The following description of the preferred embodiment is merely exemplary in nature, and is in no way intended to limit the invention or its application or uses.

Figure 1:
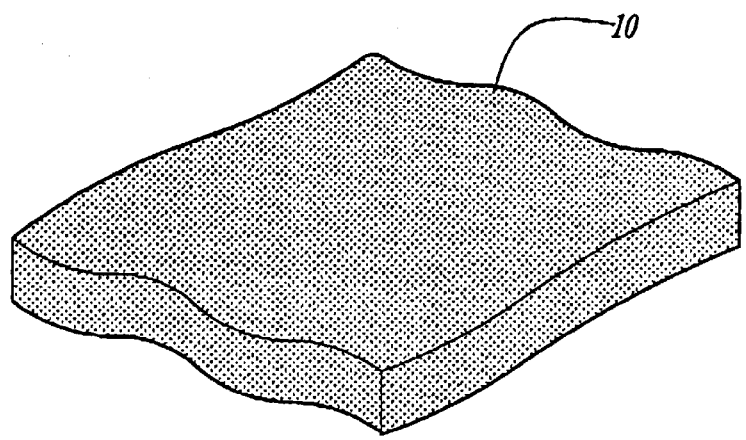
FIG. 1 is a perspective view of a ceramic fiber blanket.

In the preferred embodiment, a refractory ceramic fiber (RCF) blanket 10 is used as shown in FIG. 1. The blanket 10 is made from what is commonly referred to as either kaolin or high purity (alumina/silica) ceramic fibers. RCF is manufactured by melting appropriate materials and either blowing or spinning the molten material into fibers, using techniques well known in the art. Ceramic fiber blankets made from RCF are readily available in the thermal insulating market. A typical blanket can be purchased either from Thermal Ceramics, Inc. under the tradename KAOWOOL BLANKET™ or from Unifrax, Inc. under the tradename DURA-BLANKET™ in a variety of densities and thicknesses. Other blanket types can also be used including but not limited to polycrystalline fiber mats or felts, mineral wool, or fiberglass batts.

Figure 2:
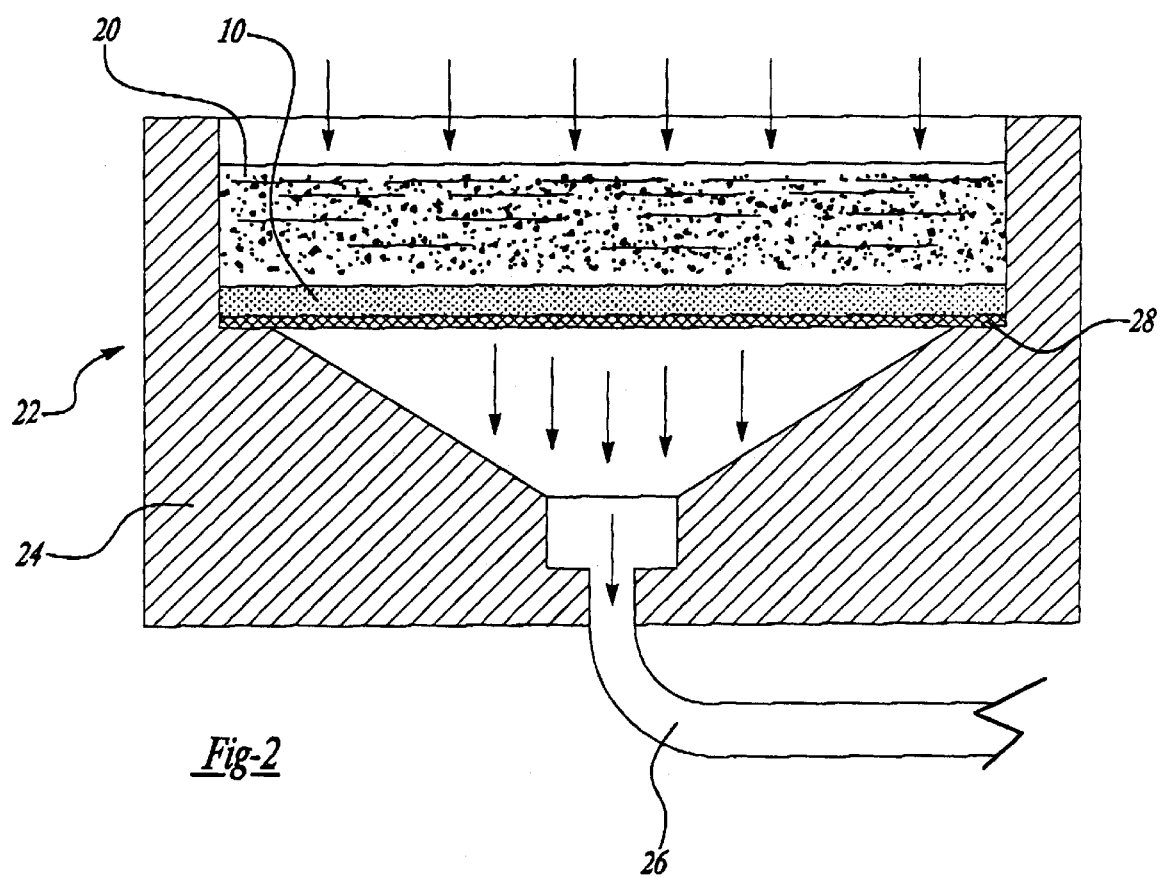
FIG. 2 is a representation of the addition of ceramic fiber slurry to a ceramic fiber blanket in a vacuum mold according to the present invention.

Ceramic fiber slurry 20 is shown in FIG. 2. The slurry 20 is made of ceramic fibers, various binders, additives, and water. Besides the previously described RCF, fibers including but not limited to mineral wool, fiberglass, and polycrystalline fibers can be used. Binders are included to aid in the bond formation within the slurry and between the blanket 10 and the slurry 20 and are readily available in the art. In the preferred embodiment, they include colloidal silica, as made by Du Pont under the tradename LUDOX™, and cationic starch. Other binders including but not limited to colloidal alumina and latex can be used. Additives such as clay fillers and polymer flocculants can also be used. Water is added to the fibers and binders to produce a consistency that is fluid enough to allow the slurry to be poured into a mold and vacuum formed into various shapes.

A simple vacuum molding apparatus 22 is shown in FIG. 2. The molding apparatus 22 includes molding walls 24, a vacuum pressure source 26, and a screen 28. The walls are made of any rigid material known in the art with a relatively smooth surface. The vacuum pressure source 26 is attached to the underside of the molding apparatus 22 and forms a seal with the molding walls 22. The pressure source 26 includes a vacuum pump, or any other pressure pump, sufficient to create a vacuum pressure in the molding apparatus 22 between the walls 24 and under the screen 28. The screen 28 spans the molding apparatus 22 and is supported by the molding walls 24. The screen 28 has holes or cavities (not shown) which allow the passage of air and water, but yet support the weight of a ceramic fiber blanket 10 and the ceramic fiber slurry 20 under vacuum. The screen 28 is typically made of metallic material known in the art. Perforated metal or other suitable materials can be used.

Figure 3:
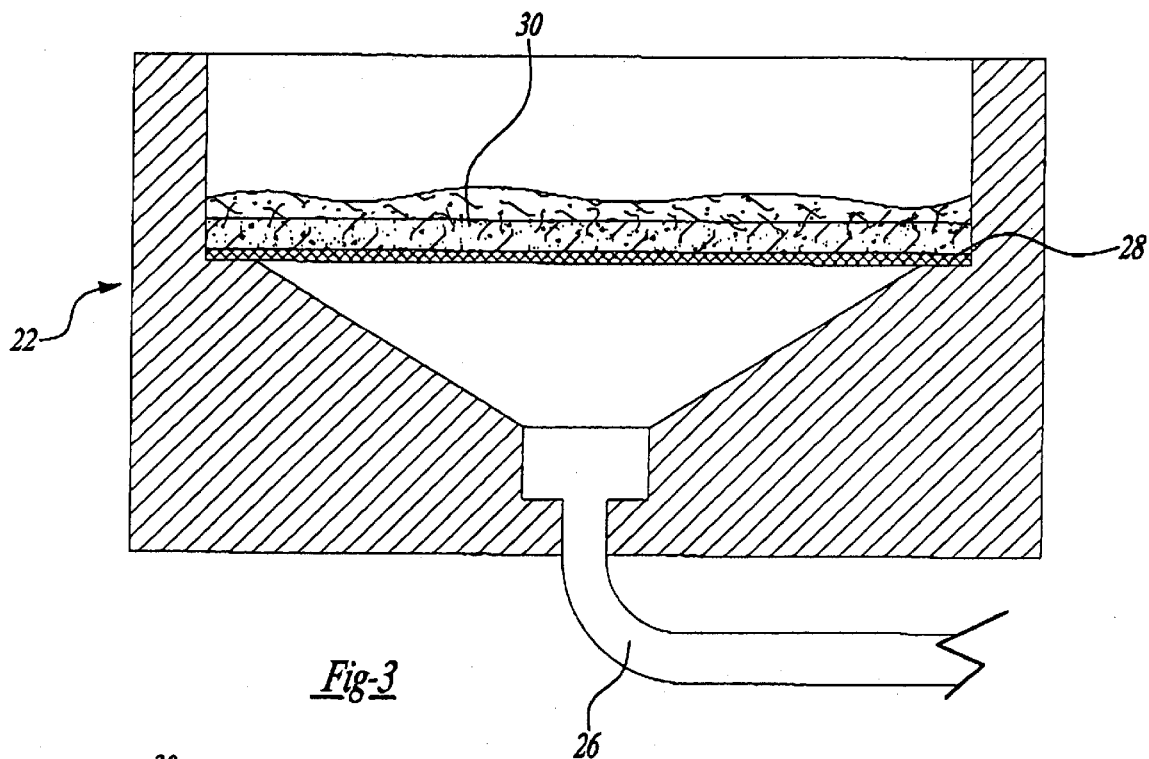
FIG. 3 is a representation of the formation of the ceramic fiber composite material according to the present invention.
Figure 4:
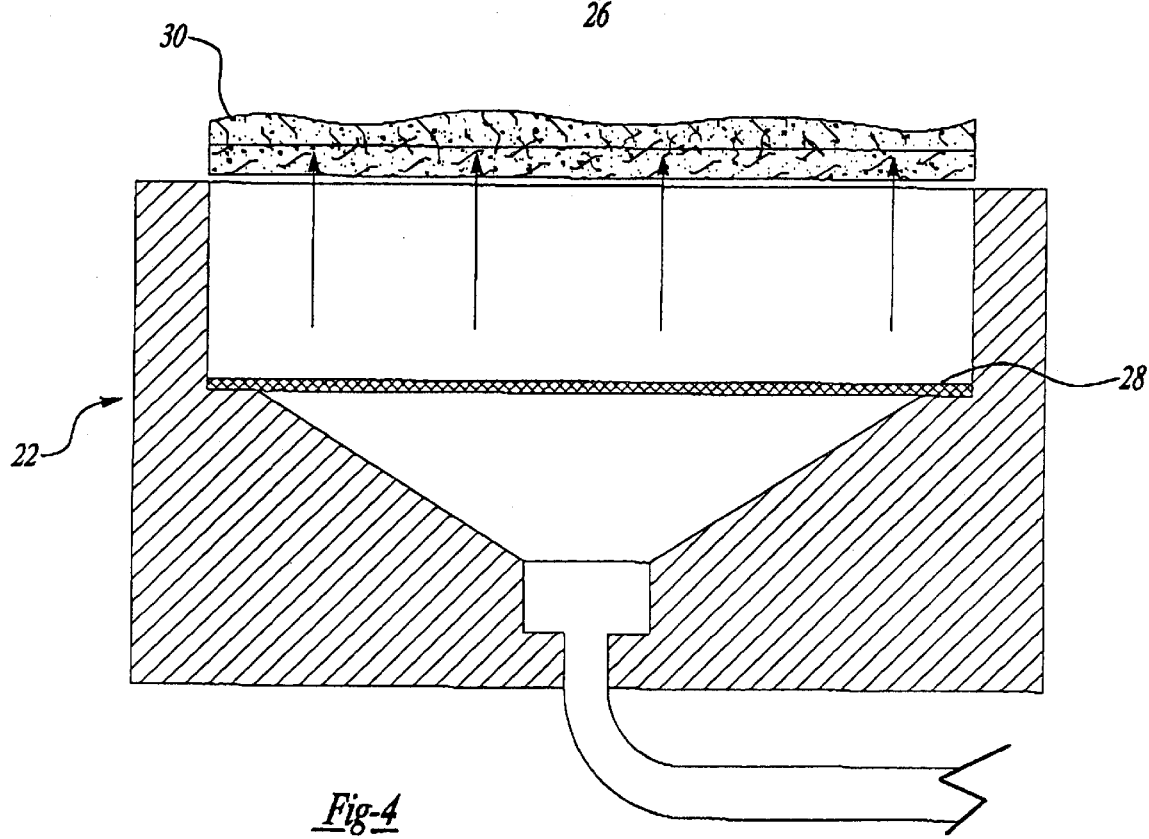
FIG. 4 is a representation of the removal of the ceramic fiber composite material from the mold.
Figure 5:
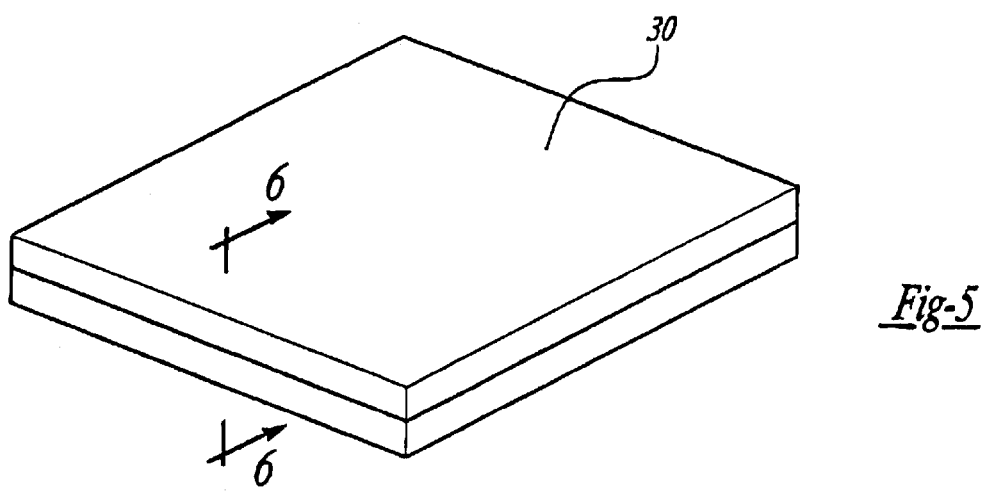
FIG. 5 is a perspective view of the ceramic fiber composite material of the present invention.
Figure 6:
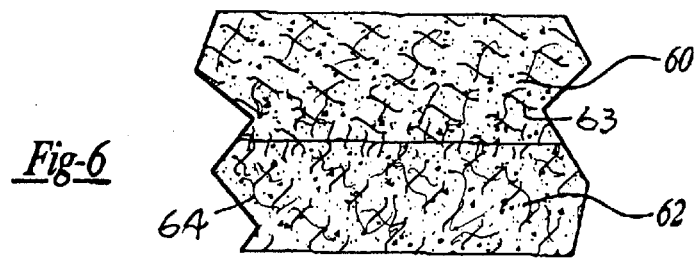
FIG. 6 is a cross-sectional view of the ceramic fiber composite material taken along the line 6—6 of FIG. 5.

The ceramic fiber composite material 30 is shown in FIGS. 3–6. The material 30 includes a top layer 60 of hardened ceramic fiber slurry and a bottom layer 62 of a stiffened ceramic fiber blanket, as shown in FIGS. 5 and 6. As shown in FIG. 6, the fibers 63 of the top layer 60 and the fibers 64 in the bottom layer 62 are entangled to form a strong bond between the two. With such a bond, the two layers form a composite material that is durable and rigid, yet relatively low-weight and surface compliant.

In conjunction with FIGS. 1–4, the operation of the molding apparatus 22 will now be described. First, the molding apparatus 22 with molding walls 24, the vacuum pressure source 26, and the screen 28, as described above, is provided. Second, the ceramic fiber blanket with the same general dimensions as the screen 28 is inserted onto the screen. Smaller sizes of ceramic fiber blanket could also be used depending on the needs of the application. Next, as shown in FIG. 2, the ceramic fiber slurry 20 is deposited onto the blanket 10. This can be accomplished by pouring the slurry onto the blanket 10 or by delivering the mold apparatus 22 to the slurry. The vacuum source pulls the fibers of the slurry 20 toward the blanket 10 forming a composite material 30 as shown in FIG. 3.

After the fibers of the slurry 20 and the blanket 10 are sufficiently entangled, the composite material 30 is removed from the apparatus 22 as shown in FIG. 4 and is dried, typically in an oven at a temperature of 230–270° F. This heating process evaporates the water from the slurry 20, fuses the binders and helps form the bond between the bottom of slurry layer 60 and the top of blanket layer 62. The resulting composite material 30 can be used as a light weight thermal insulator with strong thermal insulating properties, durable and rigid attributes, excellent thermal shock resistance, and good acoustic dampening properties.

The foregoing discussion discloses and describes a preferred embodiment of the present invention. One skilled in the art will readily recognize from such discussion and from the accompanying drawings and claims, that changes and modifications can be made to the invention without departing from the true spirit and fair scope of the invention as defined in the following claims. Many variations of the size, shape, density, and chemistry of the blanket are possible along with similar differences in the hardened slurry. Most importantly, the relative thicknesses of the blanket and hardened slurry can be optimized according to the requirements of the environment in which the composite product is to be used.

We claim:

1. A composite product comprising one rigid layer of bonded ceramic fibers and one flexible layer of ceramic fiber blanket, integrally bonded together by both fiber entanglement and fused binder material at the interface of said layers so as to retain the shape and integrity of said product.

2. The product of claim 1 wherein the ceramic fibers are selected from a group consisting of refractory ceramic fibers (RCF), mineral, wool, fiberglass, polycrystalline fibers, and/or other manmade vitreous fibers.

3. The product of claim 1 wherein the relative thicknesses of the rigid and flexible layers are varied based on thermal, acoustic, and/or cost considerations.

4. The product of claim 1 wherein the compliant blanket layer provides improved acoustic dampening properties compared to rigid ceramic fiber materials.

5. A method of making a rigid ceramic fiber composite, comprising:

(a) providing a mold;

(b) inserting a ceramic fiber blanket into the mold;

(c) depositing a ceramic fiber slurry into the mold;

(d) forming a fiber composite from the blanket and the slurry by pulling the fibers of the slurry toward the blanket thereby entangling the fibers of the blanket and the slurry; and (e) drying the composite by evaporating the excess water from the composite.

6. The method of claim 5 wherein the fibers are refractory ceramic fibers (RCF), mineral wool, fiberglass, polycrystalline fibers, and/or other manmade vitreous fibers.

7. The method of claim 5 wherein the fiber slurry includes fibers and water.

8. The method of claim 7 wherein the fiber slurry further comprises binder materials and other additives for forming a bond within and between the slurry and the blanket.

* * * * *